(12) United States Patent
Ferri et al.

(10) Patent No.: US 9,738,162 B2
(45) Date of Patent: Aug. 22, 2017

(54) ELECTRO-HYDRAULIC HYBRID SYSTEM

(71) Applicant: VIATEC, INC., Pittsboro, NC (US)

(72) Inventors: Mark Ferri, Pittsboro, NC (US);
Neeraj Chirmulay, Greenville, SC
(US); Sachin Gupta, San Ramon, CA
(US)

(73) Assignee: VIATEC, INC., Pittsboro, NC (US)

( * ) Notice: Subject to any disclaimer, the term of this patent is extended or adjusted under 35 U.S.C. 154(b) by 0 days.

(21) Appl. No.: 14/857,551

(22) Filed: Sep. 17, 2015

(65) Prior Publication Data

US 2016/0272068 A1    Sep. 22, 2016

Related U.S. Application Data

(60) Provisional application No. 62/133,517, filed on Mar. 16, 2015.

(51) Int. Cl.

| | |
|---|---|
| *B60W 20/10* | (2016.01) |
| *B60W 10/188* | (2012.01) |
| *B60L 7/26* | (2006.01) |
| *B60W 20/00* | (2016.01) |
| *B60T 7/04* | (2006.01) |
| *B60W 10/06* | (2006.01) |

(Continued)

(52) U.S. Cl.
CPC .............. *B60L 7/26* (2013.01); *B60T 1/10* (2013.01); *B60T 7/042* (2013.01); *B60T 13/586* (2013.01); *B60W 10/06* (2013.01); *B60W 10/188* (2013.01); *B60W 20/1062* (2013.01); *B60W 2540/12* (2013.01); *B60W 2710/06* (2013.01); *B60W 2710/182* (2013.01); *Y02T 90/16* (2013.01)

(58) Field of Classification Search
None
See application file for complete search history.

(56) References Cited

U.S. PATENT DOCUMENTS

| 3,083,533 A | * | 4/1963 | Schenkelberger | ..... B60K 17/10 |
| | | | | 180/442 |
| 4,348,863 A | * | 9/1982 | Taylor | ...................... B60K 6/12 |
| | | | | 60/327 |

(Continued)

*Primary Examiner* — Shelley Chen
(74) *Attorney, Agent, or Firm* — Jackson Walker LLP; Christopher J. Rourk

(57) ABSTRACT

An electro-hydraulic hybrid system for a vehicle utilizes both the advantages of the hydraulic hybrid system and the electric hybrid system to maximize the collection of energy lost during a braking process and to provide launch assists in an acceleration process. The electro-hydraulic hybrid system includes an ECU that controls the electro-hydraulic hybrid system, a hydraulic drive pump, an accumulator, a hydraulic reservoir, a hydraulic pump, an electric motor, a power converter, and a battery. The hydraulic reservoir is in fluid communication with the accumulator through the hydraulic drive pump that functions as the main component of the hydraulic regenerative braking system. The hydraulic reservoir is also in fluid communication with the accumulator through the hydraulic pump that acts as the main component of the electro-hydraulic inter-conversion unit along with the electric motor, the at least one battery, and power converter that are electrically connected to each other.

8 Claims, 12 Drawing Sheets

(51) Int. Cl.
  *B60T 1/10*  (2006.01)
  *B60T 13/58*  (2006.01)

(56) References Cited

U.S. PATENT DOCUMENTS

| | | | | |
|---|---|---|---|---|
| 5,505,527 | A * | 4/1996 | Gray, Jr. | B60K 6/00 180/165 |
| 7,597,172 | B1 * | 10/2009 | Kovach | F16H 47/02 180/305 |
| 8,336,304 | B2 * | 12/2012 | Mustafa | F02B 33/40 415/61 |
| 8,584,452 | B2 * | 11/2013 | Lloyd | B60K 6/12 60/413 |
| 8,820,443 | B2 | 9/2014 | Ferri | |
| 8,887,690 | B1 * | 11/2014 | Sturman | F02B 47/04 123/27 R |
| 9,199,647 | B2 * | 12/2015 | Zhang | B60K 6/12 |
| 2002/0057582 | A1 * | 5/2002 | Nakayama | B60K 6/445 363/17 |
| 2006/0060016 | A1 * | 3/2006 | Mazza | F03G 3/00 74/111 |
| 2007/0182245 | A1 * | 8/2007 | DuCharme | B60K 7/0015 303/152 |
| 2010/0064675 | A1 * | 3/2010 | Mustafa | F02B 33/40 60/345 |
| 2011/0056195 | A1 * | 3/2011 | Lloyd | B60K 6/12 60/462 |
| 2012/0173104 | A1 * | 7/2012 | Zhang | B60K 6/12 701/70 |
| 2013/0294825 | A1 * | 11/2013 | Loeffler | F16D 1/06 403/359.1 |
| 2013/0307322 | A1 * | 11/2013 | Kim | B60T 7/042 303/6.01 |
| 2014/0126999 | A1 * | 5/2014 | Francis Lloyd | F16D 1/02 415/122.1 |
| 2014/0214253 | A1 * | 7/2014 | Inoue | E02F 9/26 701/22 |

\* cited by examiner

ELECTRO-HYDRAULIC HYBRID SYSTEM

The current application claims a priority to the U.S. Provisional Patent application Ser. No. 62/133,517 filed on Mar. 16, 2015.

FIELD OF THE INVENTION

The present invention relates generally to a regenerative braking system of a vehicle. More specifically, the present invention combines the advantages of a hydraulic hybrid system and an electric hybrid system to efficiently maximize the collection and storage of energy that is later utilized to assist in acceleration.

BACKGROUND OF THE INVENTION

Class 4, 5, 6, 7, 8, 9, and 10 vehicles that can include, but are not limited to medium duty trucks, heavy duty trucks, and buses, are often used for transportation purposes across the world. These types of vehicles are mainly used by construction companies, retail companies, and any other type of similar organizations so that goods and passengers can be transported. The main downside of these type of vehicle classes is that they have very low fuel economy that ultimately translates into higher environmental pollution and higher operating costs. In order to overcome this problem, the transportation sector has recently implemented new sanctions and regulations for newer medium to heavy duty trucks. Even though different automobile manufacturers, which manufacture medium to heavy duty trucks, have taken strides toward meeting the new sanctions and regulations, these automobile manufacturers have not been able to provide a cost-effective solution for existing medium to heavy duty trucks.

It is an object of the present invention to provide an efficient electro-hydraulic hybrid system that improves the fuel economy, extends the operating life of engine and brakes by lowering impact, and meets new sanctions and regulations that are related to the transportation sector. Additionally, the present invention is able to immediately overcome the higher environmental pollution and higher operating costs as the present invention can be pre-manufactured into newer vehicles or retrofitted into existing vehicles.

DETAILED DESCRIPTIONS OF THE INVENTION

All illustrations of the drawings are for the purpose of describing selected versions of the present invention and are not intended to limit the scope of the present invention.

Figure 4:
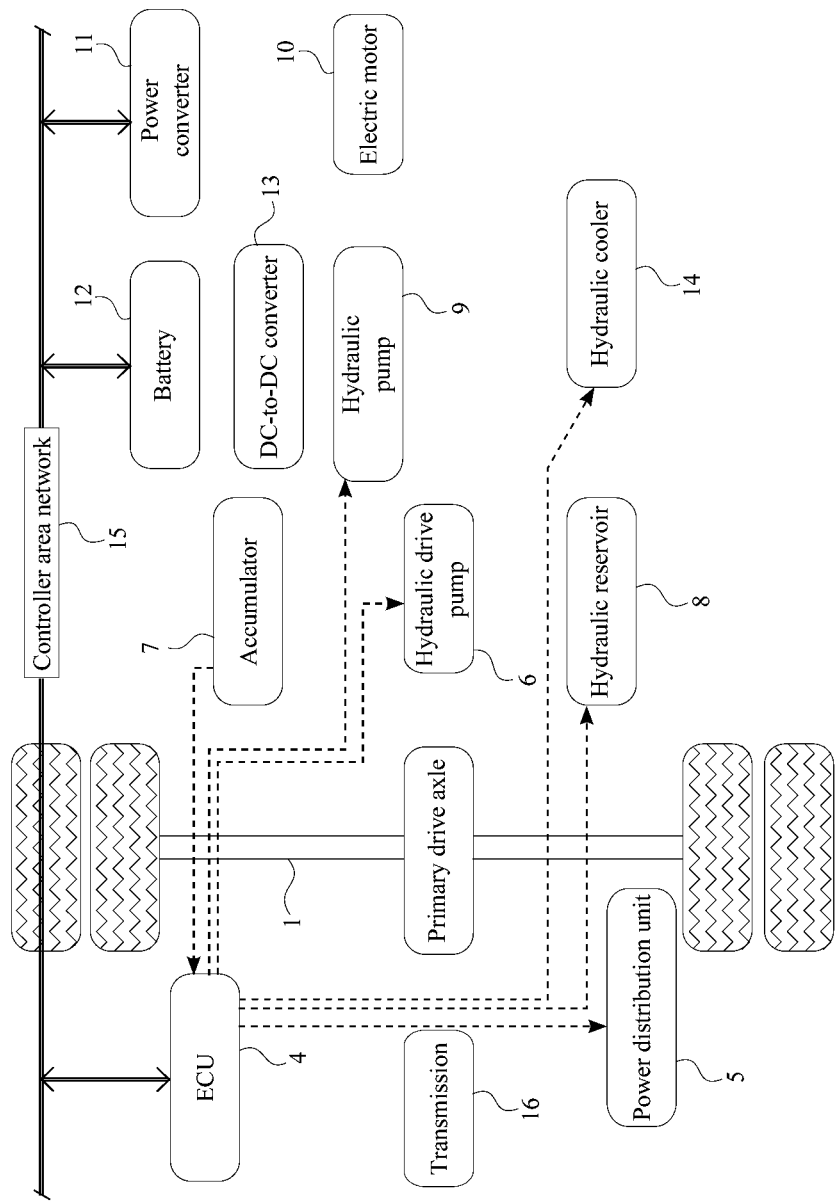
FIG. 4 is a schematic diagram of the present invention, showing the electronic connections within the preferred system.

The present invention is an electro-hydraulic hybrid system and a method that efficiently combines the advantages of a hydraulic hybrid system and an electric hybrid to maximize the collection of energy lost during a braking process. The present invention also assists in an acceleration process by converting the stored energy, which is collected through the braking process, into kinetic energy. The electro-hydraulic hybrid system is preferably pre-manufactured or retrofitted into class 4, 5, 6, 7, 8, 9, and 10 vehicles. In reference to FIG. 1, FIG. 2, and FIG. 4, the preferred system comprises an electronic control unit 4 (ECU), a power distribution unit 5, a hydraulic drive pump 6, an accumulator 7, a hydraulic reservoir 8, a hydraulic pump 9, an electric motor 10, a power converter 11, at least one battery 12, and a hydraulic cooler 14. As for the general configuration of the preferred system, the hydraulic reservoir 8 is in fluid communication with the accumulator 7 through the hydraulic drive pump 6 that functions as the main component of the hydraulic regenerative braking system. The hydraulic reservoir 8 is also in fluid communication with the accumulator 7 through the hydraulic pump 9, where the hydraulic pump 9 functions as one of the main components of the electro-hydraulic inter-conversion unit of the preferred system. The electric motor 10 is torsionally connected with the hydraulic pump 9 while the at least one battery 12 is electrically connected with the electric motor 10 through the power converter 11 so that the electric motor 10, the power converter 11, and the at least one battery 12 can complete the electric energy conversion unit within the preferred system. The ECU 4 that electronically controls the preferred system is electrically connected with the at least one battery 12 so that the ECU 4 can be powered through the at least one battery 12. The power distribution unit 5 is also electrically connected with the at least one battery 12 as the power distribution unit 5 electrically powers the hydraulic cooler 14, the power converter 11, and any other sensors and/or other components that require electrical power for operation and/or communication.

Figure 7A:
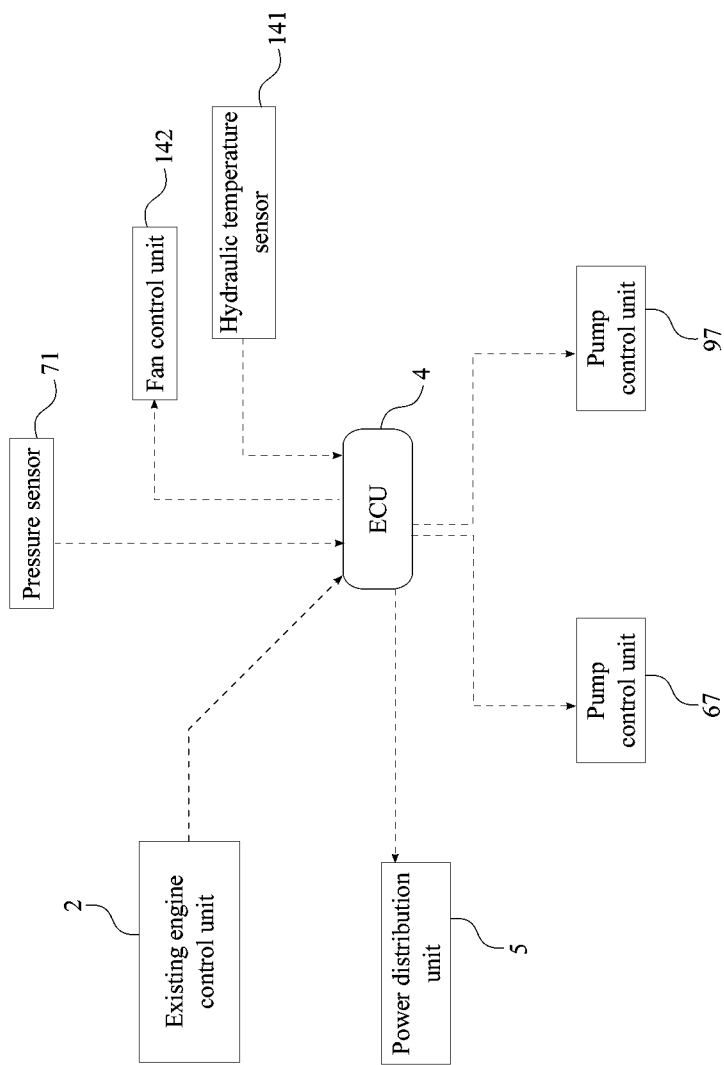
FIG. 7A is a schematic diagram of the ECU, showing the complete electronic connections within the preferred system.

The ECU 4, that is programmed to maximize the performance of the preferred system, is electronically connected with the power distribution unit 5 so that the ECU 4 is able to control the functionality of the power distribution unit 5 according to the system parameters. In reference to FIG. 7A, the ECU 4 is also communicably connected with an existing engine control unit 2 of the vehicle through a controller area network 15 so that the preferred system is able to identify the method of operation with respect the vehicular acceleration or braking. If the vehicular braking information is not available through the existing engine control unit 2, a brake pressure sensor has to be installed within the friction braking system of the vehicle. For example, when the ECU 4 receives braking information from the existing engine control unit 2 or the brake pressure sensor, the ECU 4 activates the braking process to recapture some of the energy lost during the braking of the vehicle. When the ECU 4 receives acceleration information from the existing engine control unit 2, the ECU 4 activates the acceleration process to assist in the acceleration of the vehicle.

The combined performance of the hydraulic drive pump 6, the hydraulic reservoir 8, the accumulator 7, and the ECU 4 complete the hydraulic regenerative braking stage of the preferred system. The hydraulic reservoir 8 provides a low pressure storage compartment for the hydraulic fluid so that the hydraulic fluid can be utilized by the hydraulic drive pump 6 and the hydraulic pump 9 when necessary. The hydraulic reservoir 8 is in fluid communication with the hydraulic cooler 14 to maintain an optimal operating temperature for the hydraulic fluid. In reference to FIG. 7A, a hydraulic temperature sensor 141 of the hydraulic reservoir 8 is electronically connected with the ECU 4 so that the temperature of the hydraulic fluid within the hydraulic reservoir 8 can be continuously reported to the ECU 4. When the ECU 4 detects elevated temperature readings from the hydraulic temperature sensor 141, the elevated temperature of the hydraulic fluid is decreased through a fan control unit 142 of the hydraulic cooler 14 so that the hydraulic fluid can be cooled down to the operating temperature. The power distribution unit 5 is electrically connected with the hydraulic cooler 14 so that the power distribution unit 5 is able to power all of the electrical components of the hydraulic cooler 14 including the fan control unit 142. In reference to FIG. 7A, the ECU 4 is electronically connected with the fan control unit 142 in such a way that the ECU 4 is able to control the cooling process through the activation and deactivation of the fan control unit 142 as the hydraulic fluid circulates through the hydraulic cooler 14.

The accumulator 7 provides a pressurized storage compartment for the hydraulic fluid. More specifically, a pressure sensor 71 of the accumulator 7 continuously measures an accumulator pressure value within the accumulator 7 as the accumulator pressure value is essential to the functionality of the preferred system. In reference to FIG. 7A, the pressure sensor 71 is electronically connected with the ECU 4 so that the accumulator pressure value can be continuously sent to the ECU 4.

Figure 5A:
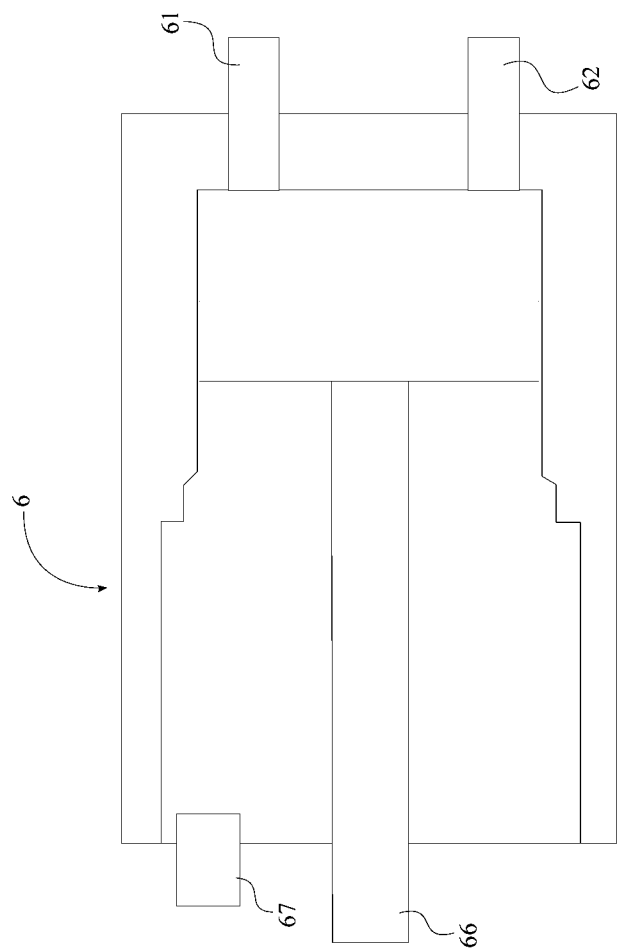
FIG. 5A is a basic schematic diagram of the hydraulic drive pump of the preferred system.

The hydraulic drive pump 6 can be a fixed or variable displacement pump that reverses the hydraulic fluid flow when required by the ECU 4. In reference to FIG. 5A, the hydraulic drive pump 6 comprises a low-pressure port 61, a high-pressure port 62, a rotor assembly 66, and a pump control unit 67, where the low-pressure port 61 is in fluid communication with the hydraulic reservoir 8 and the high-pressure port 62 is in fluid communication with the accumulator 7. As a result of the in fluid communication between the hydraulic reservoir 8 and the accumulator 7, the hydraulic fluid can be transferred across the hydraulic drive pump 6 by the rotor assembly 66. More specifically, the low-pressure port 61 and the high-pressure port 62 are in fluid communication with each other through the rotor assembly 66 while the rotor assembly 66 is torsionally coupled with a primary drive axle 1 of the vehicle so that the hydraulic drive pump 6 can be actuated by the primary drive axle 1. When the hydraulic fluid transfers from the hydraulic reservoir 8 to the accumulator 7, the hydraulic drive pump 6 functions as a pump unit within the preferred system. However, when the hydraulic fluid transfers from the accumulator 7 to the hydraulic reservoir 8, the hydraulic drive pump 6 functions as a motor unit within the preferred system. The pump control unit 67 is electronically connected with the ECU 4 so that the hydraulic drive pump 6 can be activated or deactivated according to the parameters of the ECU 4. Depending upon the braking information or the acceleration information, the hydraulic drive pump 6 determines the directional flow of the hydraulic fluid so that the vehicle can be slowed down with the preferred system or accelerated with the preferred system.

Figure 5B:
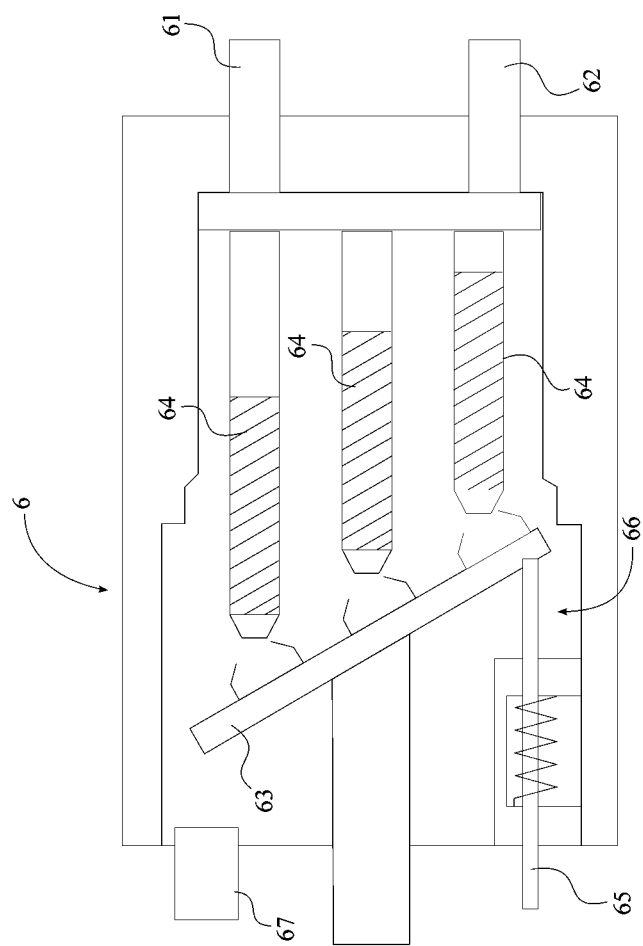
FIG. 5B is a basic schematic diagram of the preferred hydraulic drive pump of the preferred system.
Figure 7B:
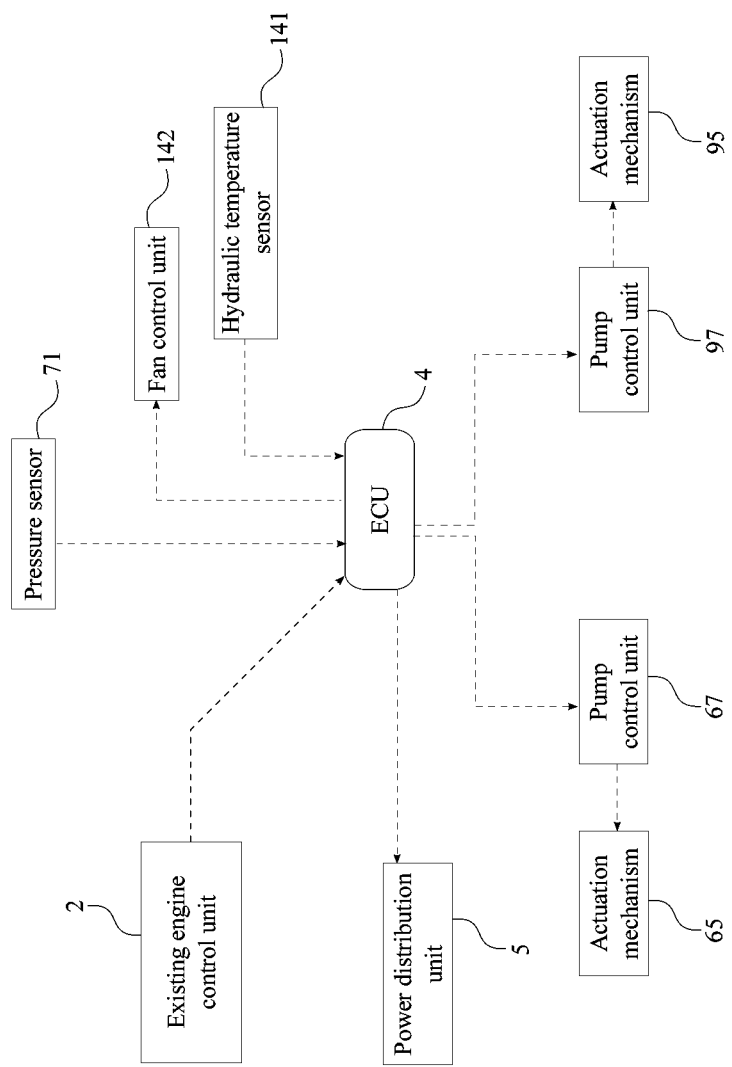
FIG. 7B is a schematic diagram of the ECU, showing the complete electronic connections within the preferred system and in relation to the preferred hydraulic drive pump and the hydraulic pump.

A preferred embodiment of the hydraulic drive pump 6 is illustrated in FIG. 5B as the hydraulic drive pump 6 comprises a swashplate 63, a plurality of axial pistons 64, and an actuation mechanism 65 in addition to the low-pressure port 61 and the high-pressure port 62. In reference to FIG. 1, FIG. 2, and FIG. 4, the low-pressure port 61 is in fluid communication with the hydraulic reservoir 8 while the high-pressure port 62 is in fluid communication with the accumulator 7 so that the hydraulic fluid can be transferred across the hydraulic drive pump 6. The combined configuration and functionality of the swashplate 63, the plurality of axial pistons 64, and the actuation mechanism 65 delineate the rotor assembly 66 within the preferred embodiment. The plurality of axial pistons 64 is radially and pivotably mounted onto the swashplate 63 that is torsionally coupled with a primary drive axle 1 of the vehicle that is powered through the transmission 16 of the vehicle. The swashplate 63 controls the displacement of the hydraulic drive pump 6 to apply positive or negative toque based on the actuation direction of the actuation mechanism 65 and pumps hydraulic fluid from the hydraulic reservoir 8 to the accumulator 7. More specifically, the low-pressure port 61 and the high-pressure port 62 are in fluid communication with each other through the plurality of axial pistons 64 so that the configuration of the plurality of axial pistons 64 and the pitch of the swashplate 63 are able to control the hydraulic fluid flow within the hydraulic drive pump 6. In reference to FIG. 7B, the pitch of the swashplate 63 is controlled through the actuation mechanism 65 as the ECU 4 is electronically connected with the actuation mechanism 65 through the pump control unit 67.

Figure 6A:
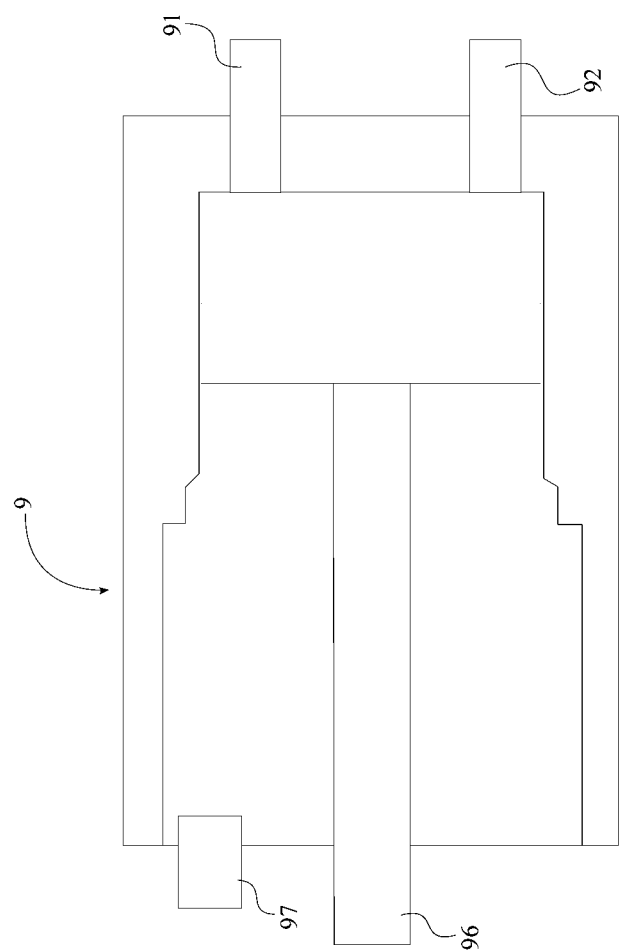
FIG. 6A is a basic schematic diagram of the hydraulic pump of the preferred system.

Similar to the hydraulic drive pump 6, the hydraulic pump 9 can be a fixed or variable displacement pump that reverses the hydraulic fluid flow when required by the ECU 4. In reference to FIG. 6A, the hydraulic pump 9 comprises a low-pressure port 91, a high-pressure port 92, a rotor assembly 96, and a pump control unit 97, where the low-pressure port 91 is in fluid communication with the hydraulic reservoir 8 and the high-pressure port 92 is in fluid communication with the accumulator 7. As a result of the in fluid communication between the hydraulic reservoir 8 and the accumulator 7, the hydraulic fluid can be transferred across the hydraulic pump 9 by the rotor assembly 96. More specifically, the low-pressure port 91 and the high-pressure port 92 are in fluid communication with each other through the rotor assembly 96 while the rotor assembly 96 is torsionally coupled with a rotor 101 of the electric motor 10 so that the hydraulic pump 9 can be actuated by the electric motor 10. When the hydraulic fluid transfers from the hydraulic reservoir 8 to the accumulator 7, the hydraulic pump 9 functions as a pump unit within the preferred system. However, when the hydraulic fluid transfers from the accumulator 7 to the hydraulic reservoir 8, the hydraulic pump 9 functions as a motor unit within the preferred system. The pump control unit 97 is electronically connected with the ECU 4 so that the hydraulic pump 9 can be activated or deactivated according to the parameters of the ECU 4.

Depending upon the accumulator pressure, the hydraulic pump 9 determines the directional flow of the hydraulic fluid so that stored hydraulic pressure energy may be converted to electrical energy or stored energy may be converted to hydraulic pressure energy.

Figure 6B:
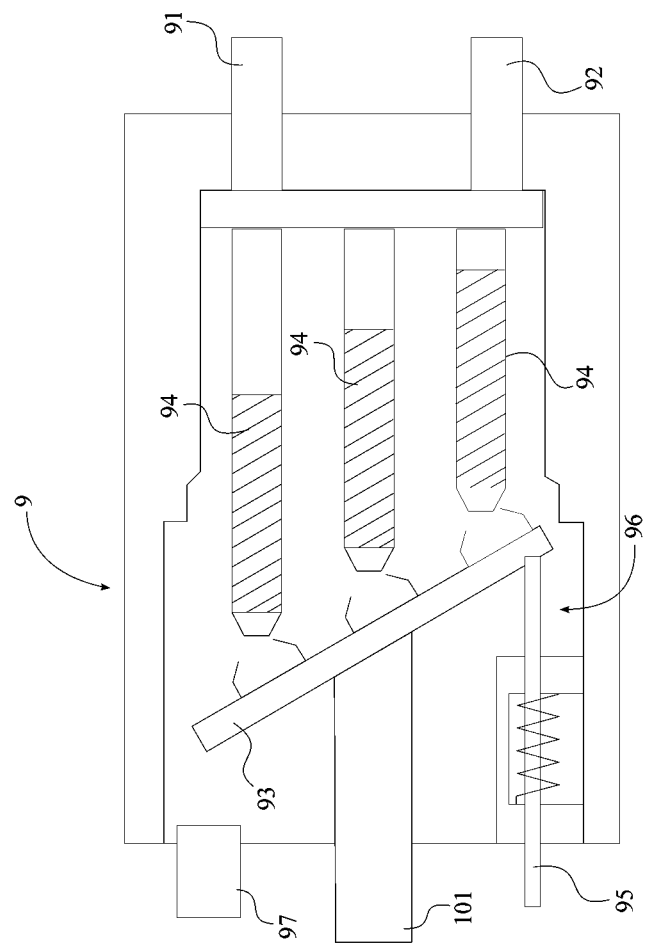
FIG. 6B is a basic schematic diagram of the preferred hydraulic pump of the preferred system.

A preferred embodiment of the hydraulic pump 9 is illustrated in FIG. 6B as the hydraulic pump 9 comprises a swashplate 93, a plurality of axial pistons 94, and an actuation mechanism 95 in addition to the low-pressure port 61 and the high-pressure port 62. In reference to FIG. 1, FIG. 2, and FIG. 4, the low-pressure port 91 is in fluid communication with the hydraulic reservoir 8 while the high-pressure port 92 is in fluid communication with the accumulator 7 so that the hydraulic fluid can be transferred across the hydraulic pump 9. The combined configuration and functionality of the swashplate 93, the plurality of axial pistons 94, and the actuation mechanism 95 delineate the rotor assembly 66 within the preferred embodiment. The plurality of axial pistons 94 is radially and pivotably mounted onto the swashplate 93 that is torsionally coupled with a rotor 101 of the electric motor 10. The swashplate 93 controls the displacement of the hydraulic drive pump 6 to apply positive or negative toque based on the actuation direction of the actuation mechanism 65 and pumps hydraulic fluid from the hydraulic reservoir 8 to the accumulator 7 or from the accumulator 7 to the hydraulic reservoir 8. More specifically, the low-pressure port 91 and the high-pressure port 92 are in fluid communication with each other through the plurality of axial pistons 94 so that the configuration of the plurality of axial pistons 94 and the pitch of the swashplate 93 are able to control the hydraulic fluid flow within the hydraulic pump 9. In reference to FIG. 7B, the pitch of the swashplate 93 is controlled through the actuation mechanism 95 as the ECU 4 is electronically connected with the actuation mechanism 95 through the pump control unit 97.

The electric motor 10, which also functions as an electric generator, is serially and electrically connected with the power converter 11 so that the power converter 11 is able to convert a flow alternating current (AC) into a flow of direct current (DC) or convert a flow of DC into a flow of AC. For example, when the hydraulic pump 9 axially rotates the electric motor 10 through the directional flow of the hydraulic fluid, the electric motor 10 functions as the electric generator and produces a flow of AC that later gets converted into a flow of DC by the power converter 11. However, when the electric motor 10 needs to axially rotate the hydraulic pump 9, the electric motor 10 utilizes the stored electrical energy within the at least one battery 12 as the power converter 11 converts a flow of DC from the at least one battery 12 into a flow of AC. The conversion of the flow of DC to the flow of AC is accomplished within the preferred system as the at least one battery 12 is serially and electrically connected with the power converter 11, opposite of the electric motor 10. The power converter 11 is electrically connected with the power distribution unit 5 so that the power converter 11 is able to perform within the system parameters.

Figure 3:
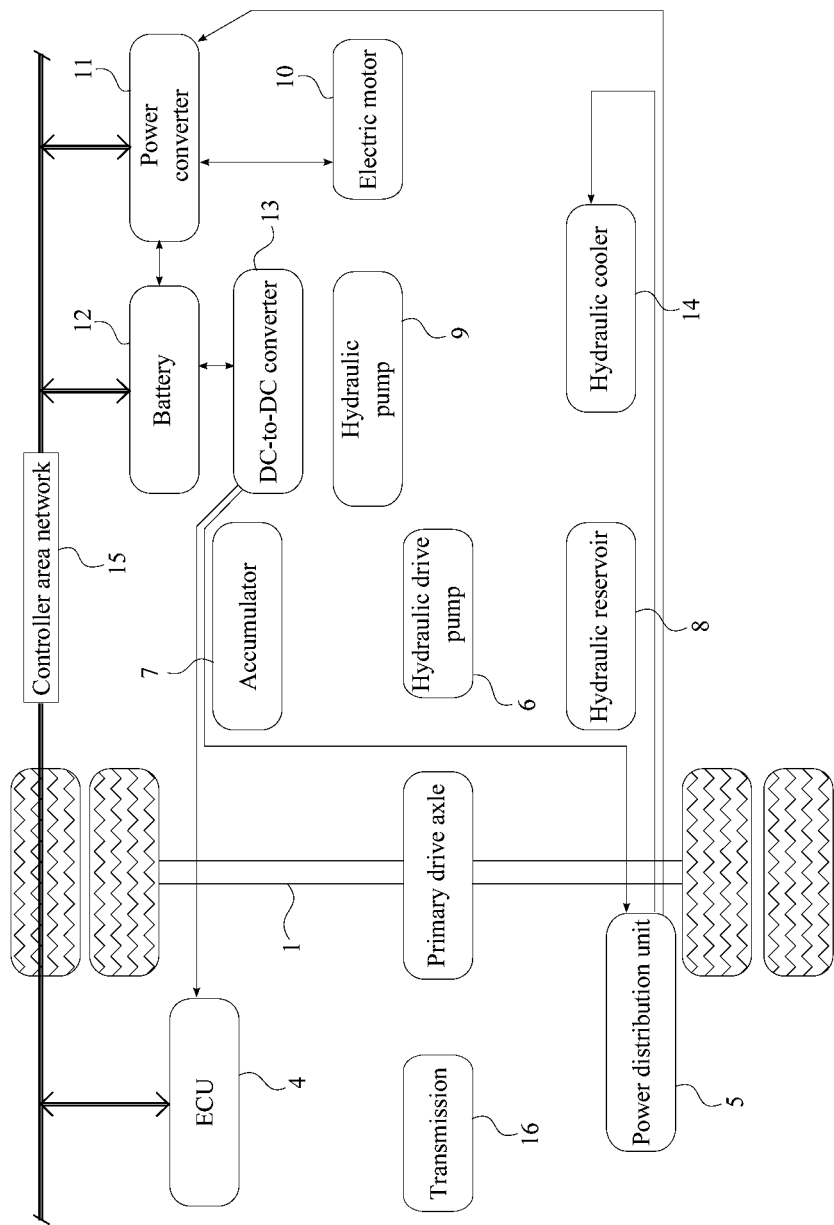
FIG. 3 is a schematic diagram of the present invention, showing the electrical connections of the preferred system through the DC-to-DC converter.

In reference to FIG. 3, if the ECU 4, the power distribution unit 5, the hydraulic cooler 14, the power converter 11, or the electric motor 10 operates in a different voltage compared to the voltage of the at least one battery 12, the preferred system utilizes a direct current (DC)-to-DC converter 13. The DC-to-DC converter 13 is serially and electrically connected with the at least one battery 12, opposite of the power converter 11, so that a flow of DC from the at least one battery 12 can be converted from one specific voltage to another. Since the ECU 4 and the power distribution unit 5 are electrically connected with the at least one battery 12 and may operate in a different voltage compared to the at least one battery 12, the DC-to-DC converter 13 is electrically connected in between those components. More specifically, the ECU 4 is electrically connected with the at least one battery 12 through the DC-to-DC converter 13 while the power distribution unit 5 is also electrically connected with the at least one battery 12 through the DC-to-DC converter 13 so that the DC-to-DC converter 13 can provide the correct voltage requirement for the ECU 4 and other electronic components through the power distribution unit 5.

Figure 1:
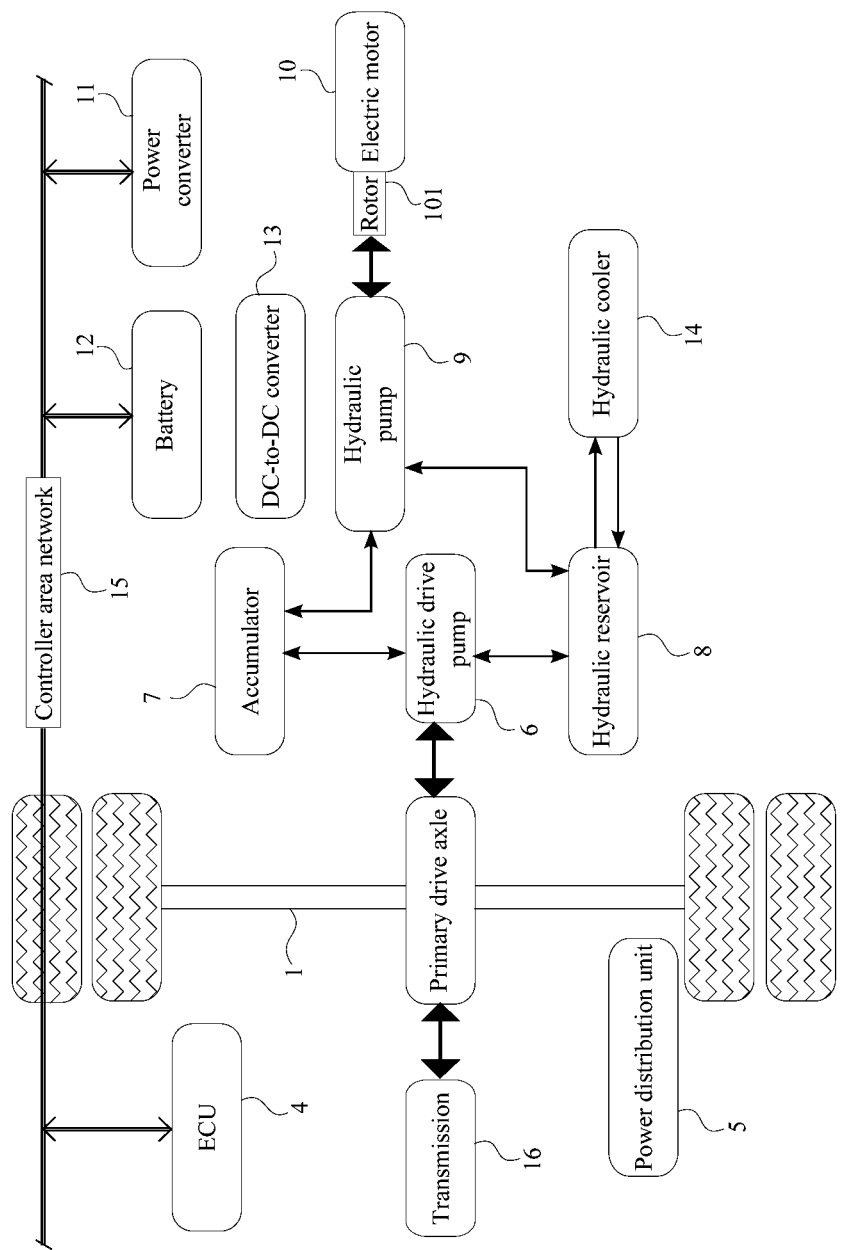
FIG. 1 is a schematic diagram of the present invention, showing the fluid communications and mechanical connections within the preferred system.
Figure 2:
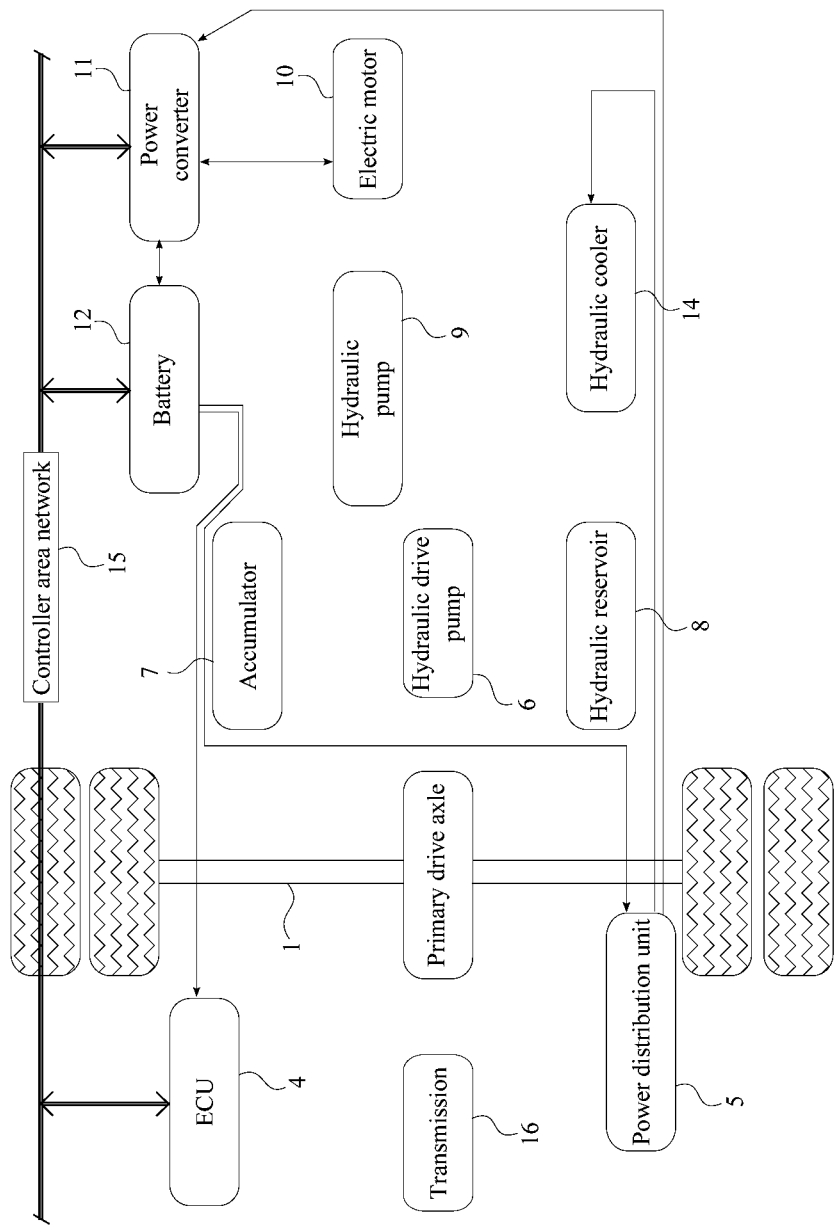
FIG. 2 is a schematic diagram of the present invention, showing the electrical connections of the preferred system.

In reference to FIG. 1, the ECU 4 is communicably connected with the at least one battery 12 and the power converter 11 through the controller area network 15 so that the ECU 4 is able to communicate with both components during the operation of the preferred system in addition to the existing engine control unit 2.

The preferred system can be retrofitted or pre-manufactured with multiple configurations, where one does not precede the other. In a preferred configuration, the hydraulic drive pump 6 engages with the primary drive axle 1 so that the preferred system can be operational. In an alternative configuration, the hydraulic drive pump 6 can be axially connected with the driveshaft of the vehicle, where a rotor shaft of the hydraulic drive pump 6 becomes an integral part of the driveshaft assembly but may or may not share the same rotational axis with the driveshaft. In another alternative configuration, the hydraulic drive pump 6 can also be operatively engaged with the drive shaft through a gearbox. In another alternative configuration, the hydraulic drive pump 6 is engaged with a secondary or tandem axle and not to the primary drive axle 1. Even though the preferred configuration only utilizes a single hydraulic drive pump 6, alternative embodiments of the present invention can utilize at least one secondary hydraulic drive pump as the hydraulic drive pump 6 and the at least one secondary hydraulic drive pump can utilize any of the above configurations. In another alternative configuration of the present invention, the hydraulic drive pump 9 and/or the one or more additional hydraulic drive pumps may each be a combination of two or more pumps, torsionally connected to each other.

Figure 8:
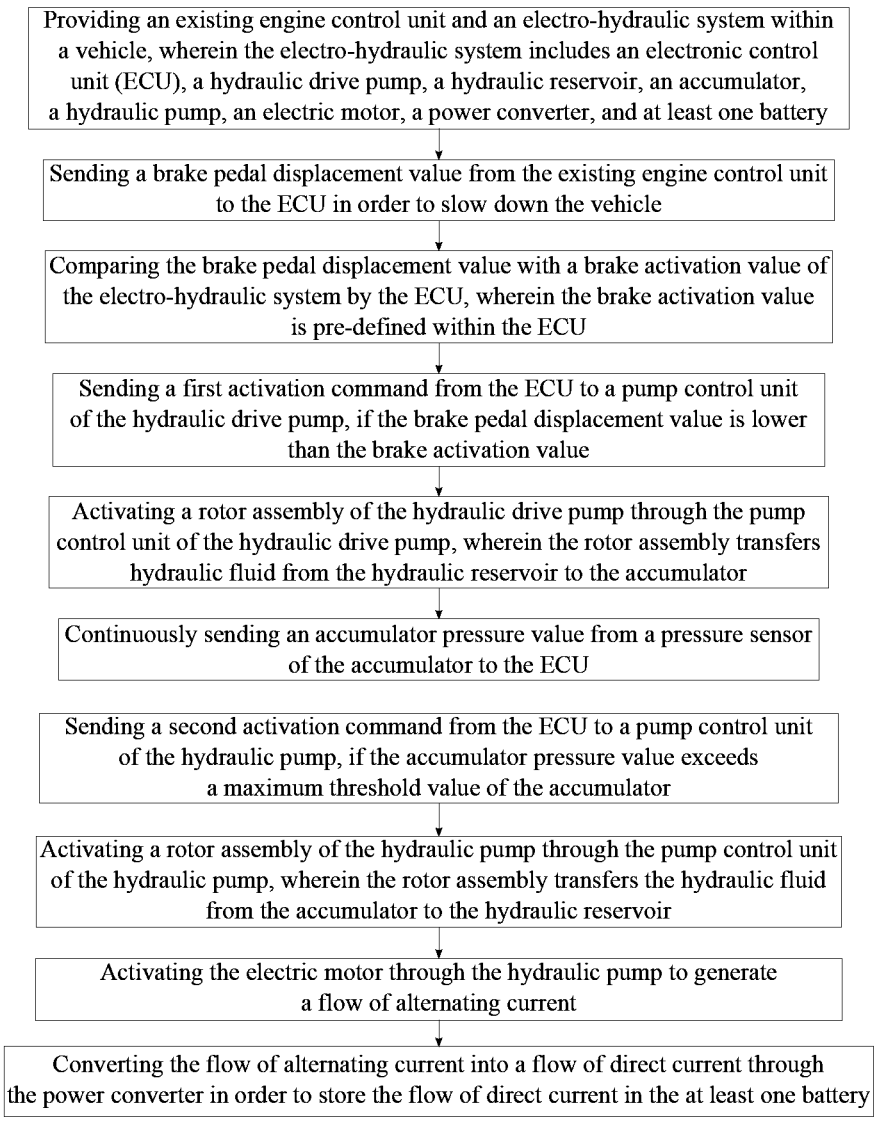
FIG. 8 is a flow chart illustrating the basic overall braking method of the preferred system.

In reference to the braking process of the preferred system that is shown in FIG. 8, the method begins when the existing engine control unit 2 or the brake pressure sensor sends a brake pedal displacement value to the ECU 4. Then the ECU 4 compares the brake pedal displacement value with a brake activation value of the preferred system. The brake activation value is pre-defined within the ECU 4 and allows the ECU 4 to determine that the preferred system or the friction braking system, which can be mechanical, hydraulic, or pneumatic brake system, should be activated to slow down the vehicle. If the brake pedal displacement value is lower than the brake activation value, the ECU 4 sends a first activation command to the pump control unit 67 of hydraulic drive pump 6. Then the pump control unit 67 of the hydraulic drive pump 6 activates the rotor assembly 66 of the hydraulic drive pump 6 so that the hydraulic fluid can be transferred from the hydraulic reservoir 8 to the accumulator 7. More specifically, the rotor assembly 66 of the hydraulic drive pump 6 utilizes the kinetic energy of vehicle through the primary drive axle 1 so that the vehicle begins to slow down as soon as the rotor assembly 66 of the hydraulic drive pump 6 is activated. Then the rotor assembly 66 of the hydraulic drive pump 6 is able to extract the hydraulic fluid from the hydraulic reservoir 8 through the low-pressure port 61 of the hydraulic drive pump 6 and discharge the hydraulic fluid into the accumulator 7 through the high-pressure port 62 of the hydraulic drive pump 6. As a result of the rotor assembly 66 operation of the hydraulic drive pump 6, a pressurized system is created within the accumulator 7 as the hydraulic reservoir 8 continuously supplies the hydraulic fluid to the accumulator 7. In relation to the preferred embodiment of the hydraulic drive pump 6, the swashplate 63 of the hydraulic drive pump 6 is activated by the pump control unit 67. Then the swashplate 63 of the hydraulic drive pump 6 utilizes the kinetic energy of vehicle through the primary drive axle 1 so that the vehicle begins to slow down as soon as the swashplate 63 of the hydraulic drive pump 6 is activated. Then the swashplate 63 of the hydraulic drive pump 6 is able to extract the hydraulic fluid from the hydraulic reservoir 8 through the low-pressure port 61 of the hydraulic drive pump 6 and discharge the hydraulic fluid into the accumulator 7 through the high-pressure port 62 of the hydraulic drive pump 6. As a result of the swashplate 63 operation of the hydraulic drive pump 6, a pressurized system is created within the accumulator 7 as the hydraulic reservoir 8 continuously supplies the hydraulic fluid to the accumulator 7.

Since the accumulator pressure value is continuously sent to the ECU 4 through the pressure sensor 71, the ECU 4 is able to determine the maximum capacity of the accumulator 7 that is also known as a maximum pressure value of the accumulator 7, the minimum capacity of the accumulator 7 that is also known as a minimum pressure value of the accumulator 7, a maximum threshold value and a minimum threshold value of the accumulator 7 that is respectively less than the maximum pressure value and the greater than the minimum pressure value of the accumulator 7. Once the accumulator pressure value exceeds the maximum threshold value, the ECU 4 sends a second activation command to the pump control unit 97 of the hydraulic pump 9 so that the accumulator pressure value can be stabilized within the accumulator 7 without compromising the preferred system. The pump control unit 97 of the hydraulic pump 9 then activates the rotor assembly 96 of the hydraulic pump 9 so that the rotor assembly unit 96 is able to transfer the hydraulic fluid from the accumulator 7 to the hydraulic reservoir 8 while maintaining the accumulator pressure value at or below the maximum threshold value. In relation to the preferred embodiment of the hydraulic pump 9, the swashplate 93 of the hydraulic pump 9 is activated by the pump control unit 97 so that the swashplate 93 is able to transfer the hydraulic fluid from the accumulator 7 to the hydraulic reservoir 8. The activation of the hydraulic pump 9 simultaneously activates the electric motor 10 so that the electric motor 10 can function as generator to produce a flow of AC. The flow of AC is then converted into a flow of DC through the power converter 11 so that the flow of DC can be stored within the at least one battery 12.

Figure 9:
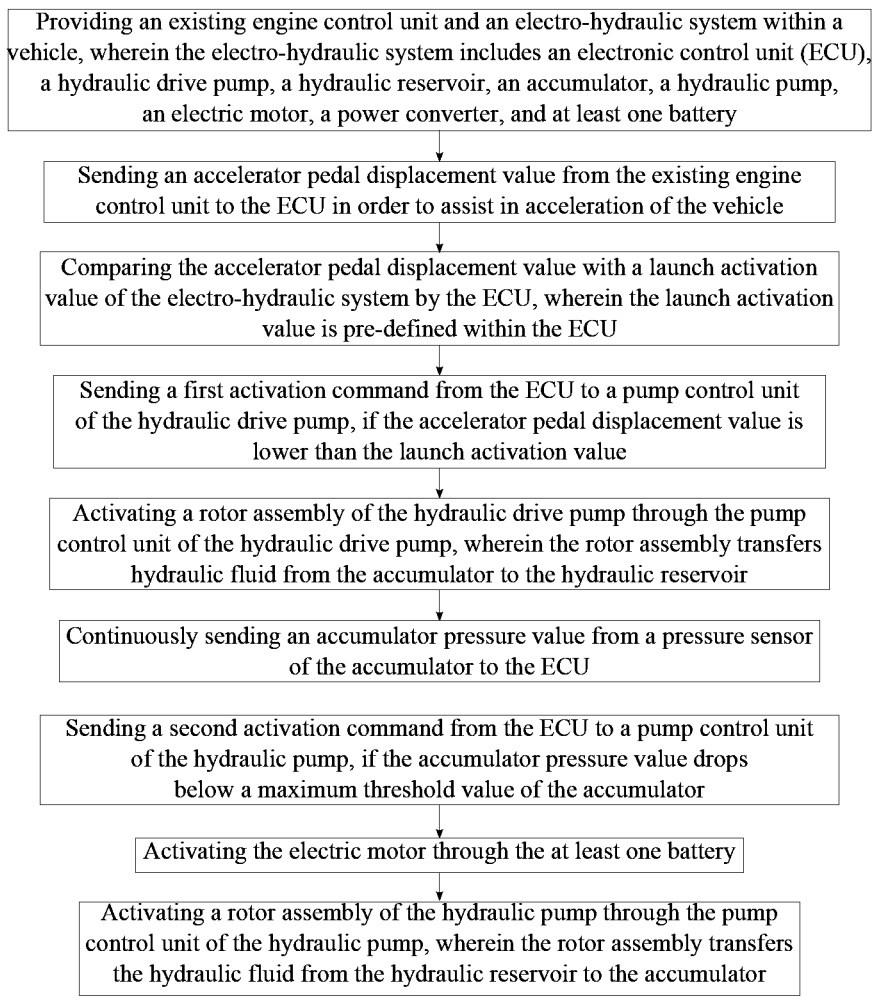
FIG. 9 is a flow chart illustrating the basic overall acceleration method of the preferred system.

In reference to the accelerating process of the preferred system that is shown in FIG. 9, the method begins when the existing engine control unit 2 sends an accelerator pedal displacement value to the ECU 4. Then the ECU 4 compares the accelerator pedal displacement value with a launch activation value of the preferred system. The launch activation value is pre-defined within the ECU 4 and allows the ECU 4 to determine when the preferred system should be activated to assist in the acceleration of the vehicle. If the accelerator pedal displacement value is greater than the launch activation value, the ECU 4 sends a first activation command to the pump control unit 67 of hydraulic drive pump 6. Then the pump control unit 67 of the hydraulic drive pump 6 activates the rotor assembly 66 of the hydraulic drive pump 6 so that the hydraulic fluid can be transferred from the accumulator 7 to the hydraulic reservoir 8. More specifically, the rotor assembly 66 of the hydraulic drive pump 6 applies torque, converting pressure energy from the accumulator 7 to kinetic energy of the vehicle, to the primary drive axle 1 to assist in acceleration of the vehicle as the pressurized hydraulic fluid from the accumulator 7 flows through the high-pressure port 62 of the hydraulic drive pump 6 to the low-pressure hydraulic reservoir 8 through the low-pressure port 61 of the hydraulic drive pump 6. As a result of the pressure difference between the accumulator 7 and the hydraulic reservoir 8, the hydraulic drive pump 6 is able to assist in acceleration of the vehicle as the rotor assembly 66 of the hydraulic drive pump 6 rotates in the same direction as the primary drive axle 1. In relation to the preferred embodiment of the hydraulic drive pump 6, the swashplate 63 of the hydraulic drive pump 6 is activated by the pump control unit 67. Then, the swashplate 63 of the hydraulic drive pump 6 applies torque, converting pressure energy from the accumulator 7 to kinetic energy of the vehicle, to the primary drive axle 1 to assist in acceleration of the vehicle as the pressurized hydraulic fluid from the accumulator 7 flows through the high-pressure port 62 of the hydraulic drive pump 6 to the low-pressure hydraulic reservoir 8 through the low-pressure port 61 of the hydraulic drive pump 6. As a result of the pressure difference between the accumulator 7 and the hydraulic reservoir 8, the hydraulic drive pump 6 is able to assist in acceleration of the vehicle as the swashplate 63 of the hydraulic drive pump 6 rotates in the same direction as the primary drive axle 1.

Since the accumulator pressure value is continuously sent to the ECU 4 through the pressure sensor 71, the ECU 4 attempts to maintain accumulator pressure value within the maximum threshold value and the minimum threshold value during the acceleration process so that the vehicle is able to receive the maximum duration of assist in acceleration. Once the accumulator pressure value drops below the minimum threshold value, the ECU 4 sends a second activation command to the pump control unit 97 of the hydraulic pump 9 so that the accumulator pressure value can be maintained within the maximum threshold value and the minimum threshold value for the operation of the hydraulic pump 9. The pump control unit 97 of the hydraulic pump 9 then activates the rotor assembly 96 of the hydraulic pump 9 so that the rotor assembly 96 is able to transfer the hydraulic fluid from the hydraulic reservoir 8 to the accumulator 7. In relation to the preferred embodiment of the hydraulic pump 9, the swashplate 93 of the hydraulic pump 9 is activated by the pump control unit 97 so that the swashplate 93 is able to transfer the hydraulic fluid from the hydraulic reservoir 8 to the accumulator 7. More specifically, the simultaneous activation of the electric motor 10 through the at least one battery 12 allows the hydraulic pump 9 to transfer the hydraulic fluid from the hydraulic reservoir 8 to the accumulator 7 after the acceleration process or during startup if the accumulator pressure is below the minimum threshold value.

Although the invention has been explained in relation to its preferred embodiment, it is to be understood that many other possible modifications and variations can be made without departing from the spirit and scope of the invention as hereinafter claimed.

What is claimed is:

1. An electro-hydraulic hybrid system that includes a braking mode and an acceleration mode of operation for use with a vehicle having a primary drive axle, the system comprises:

an electronic control unit (ECU) that in response to receiving a brake pedal displacement value from the vehicle compares the value with a stored brake activation value and determinatively sends a brake application command and in response to receiving an accelerator pedal displacement value from the vehicle compares the value with a stored launch activation value and determinatively sends an accelerator application command;

a power distribution unit;

a hydraulic drive pump;

at least one accumulator;

a hydraulic reservoir;

a hydraulic pump;

an electric motor;

a power converter;

at least one battery;

the hydraulic reservoir in fluid communication with the accumulator(s) through the hydraulic drive pump;

the hydraulic reservoir in fluid communication with the accumulator(s) through the hydraulic pump;

the hydraulic drive pump communicably coupled with the ECU and mechanically coupled with the primary drive axle of the vehicle, the hydraulic drive pump in response to receiving the brake application command transfers fluid from the hydraulic reservoir to the accumulator using energy from the drive shaft transitioning the system into the braking mode of operation and in response to receiving the accelerator application command transfers fluid from the accumulator(s) to the hydraulic reservoir supplying energy to the drive axle transitioning the system into the acceleration mode of operation;

the electric motor being torsionally connected with the hydraulic pump;

the at least one battery being electrically connected with the electric motor through the power converter;

the ECU being electrically connected with the at least one battery; and the power distribution unit being electrically connected with the at least one battery.

2. The electro-hydraulic hybrid system as claimed in claim 1 comprises:

the hydraulic drive pump comprises a low-pressure port, a high-pressure port, a rotor assembly, and a pump control unit;

the low-pressure port being in fluid communication with the hydraulic reservoir;

the high-pressure port being in fluid communication with the accumulator;

the pump control unit being electronically connected with the ECU;

the low-pressure port and the high-pressure port being in fluid communication with each other through the rotor assembly; and the rotor assembly being torsionally coupled with the primary drive axle.

3. The electro-hydraulic hybrid system as claimed in claim 1 comprises:

the hydraulic pump comprises a low-pressure port, a high-pressure port, a rotor assembly, and a pump control unit;

the low-pressure port being in fluid communication with the hydraulic reservoir;

the high-pressure port being in fluid communication with the accumulator;

the pump control unit being electronically connected with the ECU;

the low-pressure port and the high-pressure port being in fluid communication with each other through the rotor assembly; and the rotor assembly being torsionally coupled with a rotor of the electric motor.

4. The electro-hydraulic hybrid system as claimed in claim 1 comprises:

the electric motor being serially and electrically connected with the power converter;

the at least one battery being serially and electrically connected with the power converter, opposite of the electric motor; and the power distribution unit being electrically connected with the power converter.

5. The electro-hydraulic hybrid system as claimed in claim 1 comprises:

a direct current (DC)-to DC converter;

the ECU being electrically connected with the at least one battery through the DC-to-DC converter;

the power distribution unit being electrically connected with the at least one battery through the DC-to-DC converter; and the DC-to-DC converter being serially and electrically connected with the at least one battery, opposite of the power converter.

6. The electro-hydraulic hybrid system as claimed in claim 1 comprises:

the ECU being communicably connected with the at least one battery and the power converter through a controller area network;

the ECU being communicably connected with an existing engine control unit, wherein the existing engine control unit is positioned within the vehicle;

the ECU being electronically connected with a pressure sensor of the accumulator;

the ECU being electronically connected with a hydraulic temperature sensor of the hydraulic reservoir; and the ECU being electronically connected with the power distribution unit.

7. The electro-hydraulic hybrid system as claimed in claim 1 comprises:

a hydraulic cooler;

the hydraulic cooler being in fluid communication with the hydraulic reservoir;

the power distribution unit being electrically connected with the hydraulic cooler; and the ECU being electronically connected with a fan control unit of the hydraulic cooler.

8. The electro-hydraulic hybrid system as recited in claim 1 wherein the hydraulic drive pump further includes:

a rotor assembly; and a pump control unit communicably coupled with the ECU, the pump control unit determinatively activates the rotor assembly in response to receiving either accelerator application command or the brake application command.

* * * * *

UNITED STATES PATENT AND TRADEMARK OFFICE
CERTIFICATE OF CORRECTION

PATENT NO. : 9,738,162 B2
APPLICATION NO. : 14/857551
DATED : August 22, 2017
INVENTOR(S) : Mark Ferri et al.

It is certified that error appears in the above-identified patent and that said Letters Patent is hereby corrected as shown below:

In the Claims

1. In Column 9, Line 28, in Claim 1, delete "the drive shaft" and insert -- a drive shaft --, therefor.

2. In Column 10, Line 22, in Claim 5, delete "(DC)-to DC" and insert -- (DC)-to-DC --, therefor.

Signed and Sealed this
Twentieth Day of February, 2018

Andrei Iancu
*Director of the United States Patent and Trademark Office*